United States Patent
Desormeaux et al.

(10) Patent No.: US 6,854,575 B1
(45) Date of Patent: Feb. 15, 2005

US006854575B1

(54) UNIVERSAL LICENSE PLATE CORD WINDER

(76) Inventors: Donald Desormeaux, Box 949, 45 Caruso Street, Coniston, Ontario (CA), P0M 1M0; Bruno Ducharme, 241 Montée Généreux, Chelmsford (CA), P0L 1L0; Alex Naneff, 1335 Lansing Avenue, Sudbury, Ontario (CA), P3A 4C6

( * ) Notice: Subject to any disclaimer, the term of this patent is extended or adjusted under 35 U.S.C. 154(b) by 0 days.

(21) Appl. No.: 10/701,492

(22) Filed: Nov. 6, 2003

(51) Int. Cl.[7] .............................................. H02G 11/00
(52) U.S. Cl. ................................. 191/12.4; 191/12.2 R
(58) Field of Search ........................ 191/12.2 R, 12.4, 191/12.2 A; 40/200, 209

(56) References Cited

U.S. PATENT DOCUMENTS

| | | | | |
|---|---|---|---|---|
| 4,357,650 A | * | 11/1982 | Kano | 362/497 |
| 5,056,698 A | * | 10/1991 | Kozakevich | 224/488 |
| 5,255,767 A | * | 10/1993 | Norwood | 191/12.2 R |
| 5,666,749 A | * | 9/1997 | Waters | 40/204 |
| 5,669,471 A | * | 9/1997 | Unze | 191/12.2 R |
| 5,803,216 A | * | 9/1998 | McNaught | 191/12.4 |
| 6,264,016 B1 | * | 7/2001 | Bales | 191/12.4 |
| 6,286,238 B1 | * | 9/2001 | Harrington | 40/202 |

* cited by examiner

Primary Examiner—Mark T. Le

(57) ABSTRACT

The present invention relates to an improved cord-winding device universally mountable to any front or rear North-American-style license plate bracket, accommodating all electrical devices, which require a 120VAC power supply for a vehicle. The present invention comprises; a housing containing: a reel, a connection box, a male cord housing, a cord hatch and mounting holes, a closure plate and a universal mounting plate. A female receptacle extends from the housing to allow electrical connections to be made in a place away from weather exposure such as engine or rear compartment. The universal license plate cord winder of the present invention can thereby be mounted either from the top or the bottom of housing without compromising the structural integrity of the attachment while maintaining a water tightness required by such a device.

8 Claims, 5 Drawing Sheets

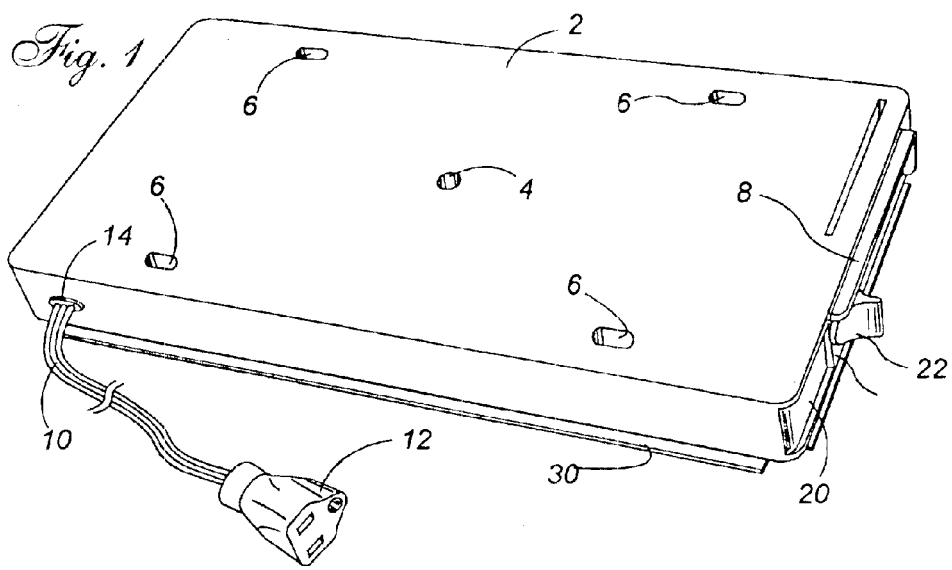
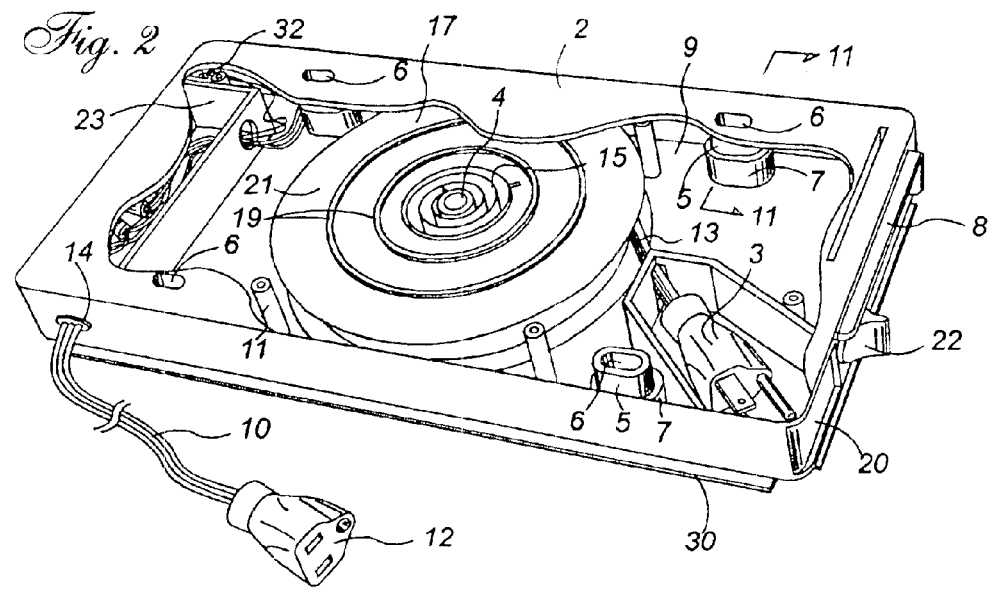

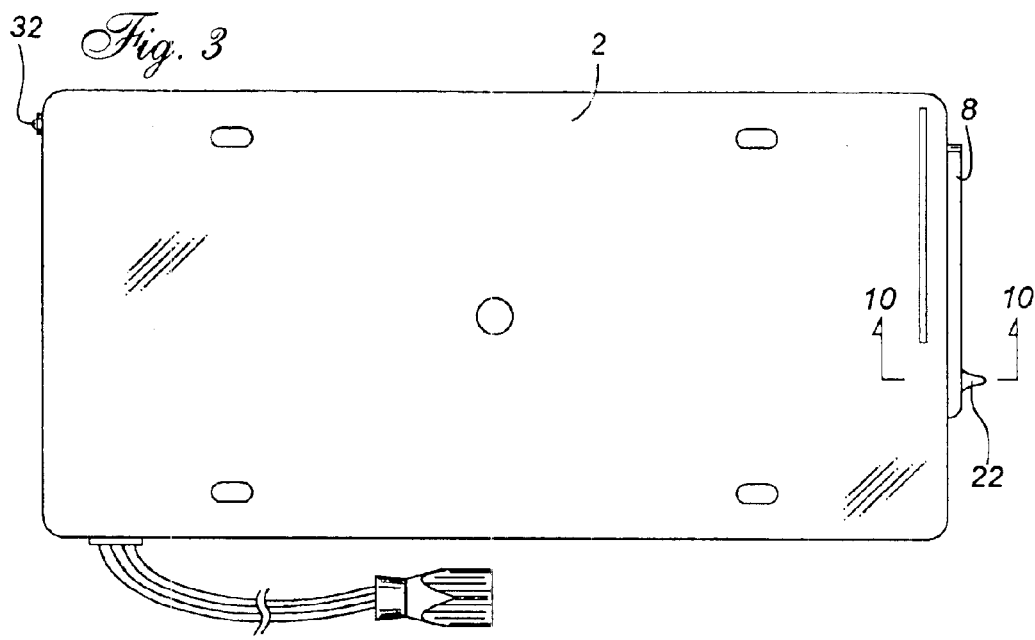
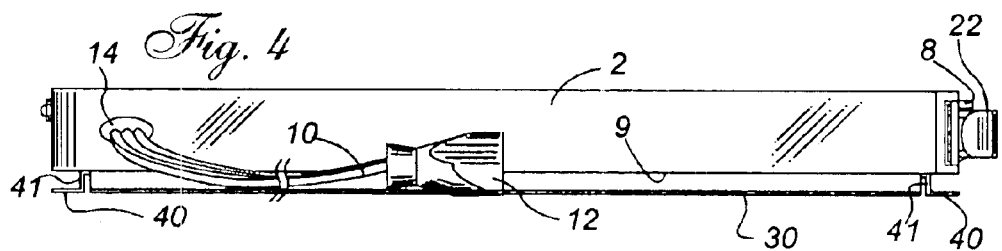
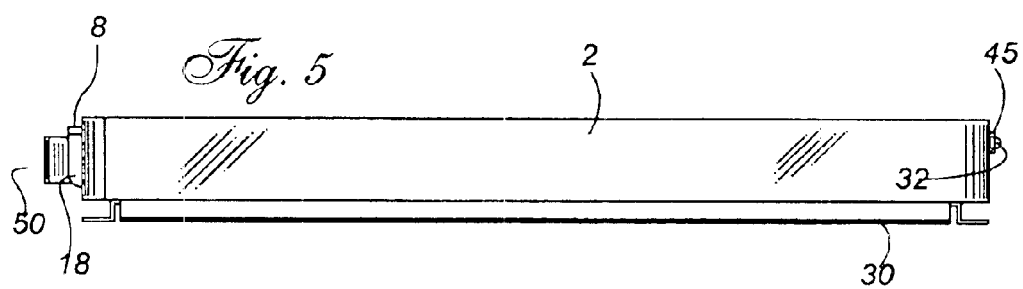

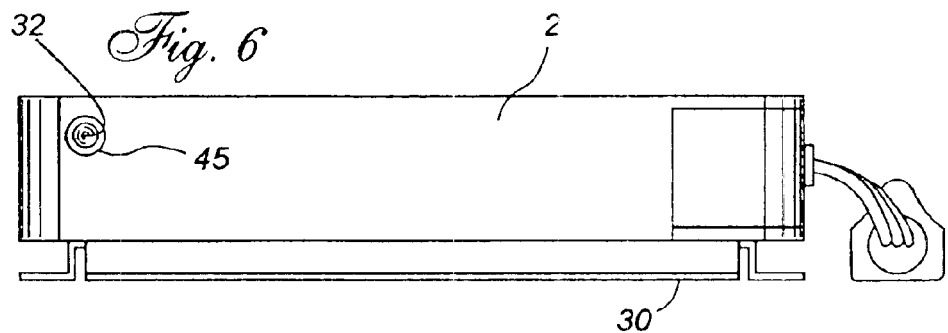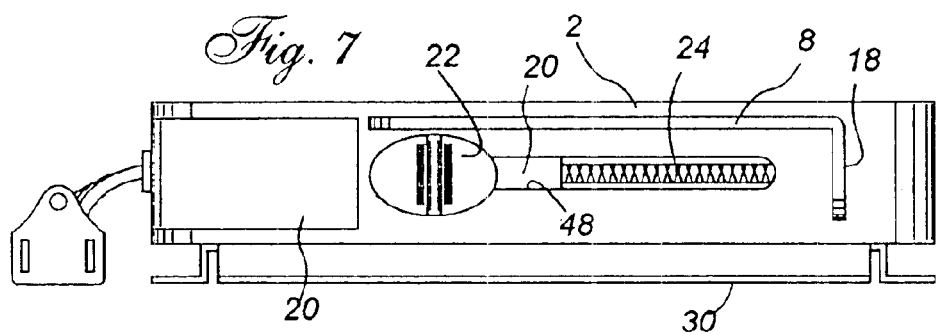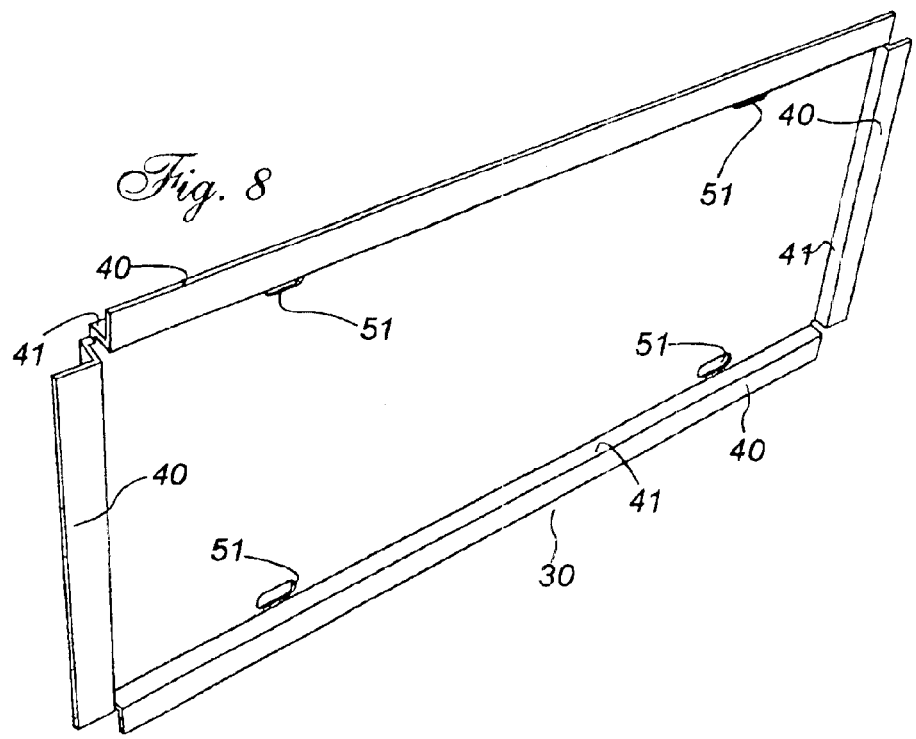

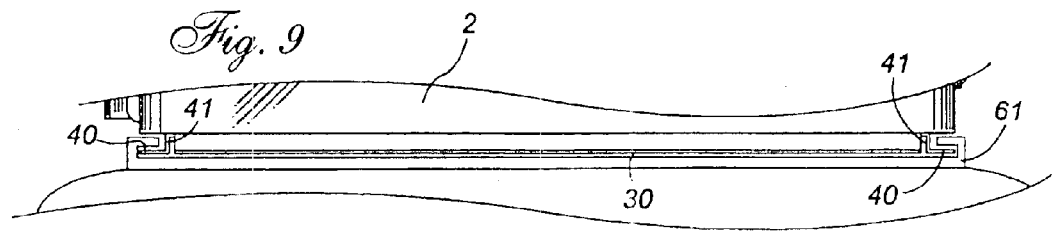
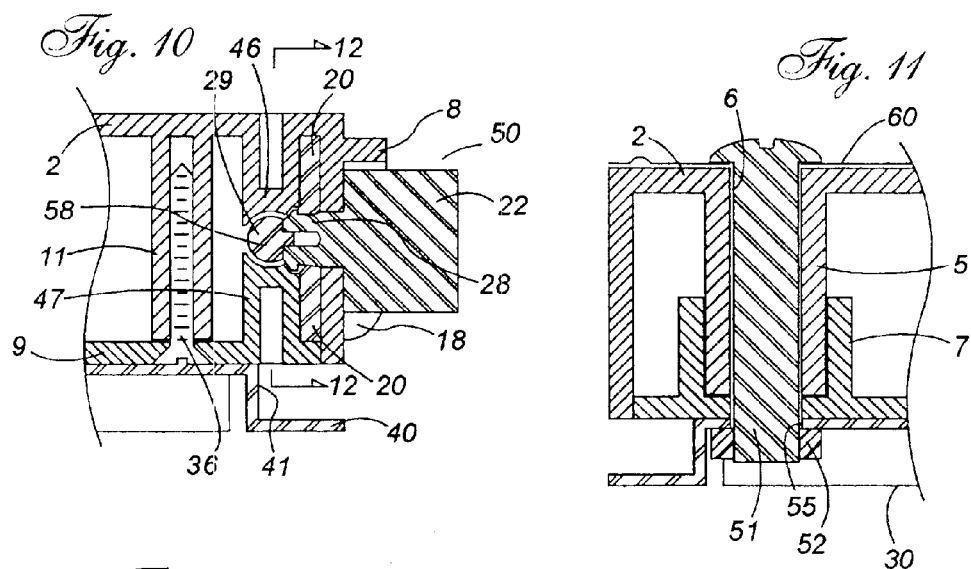
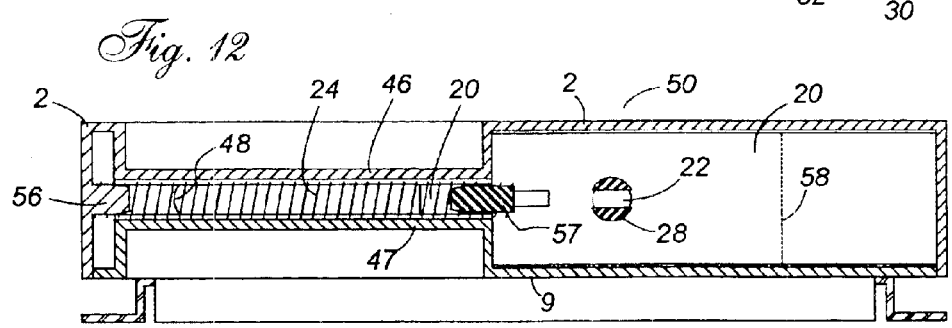

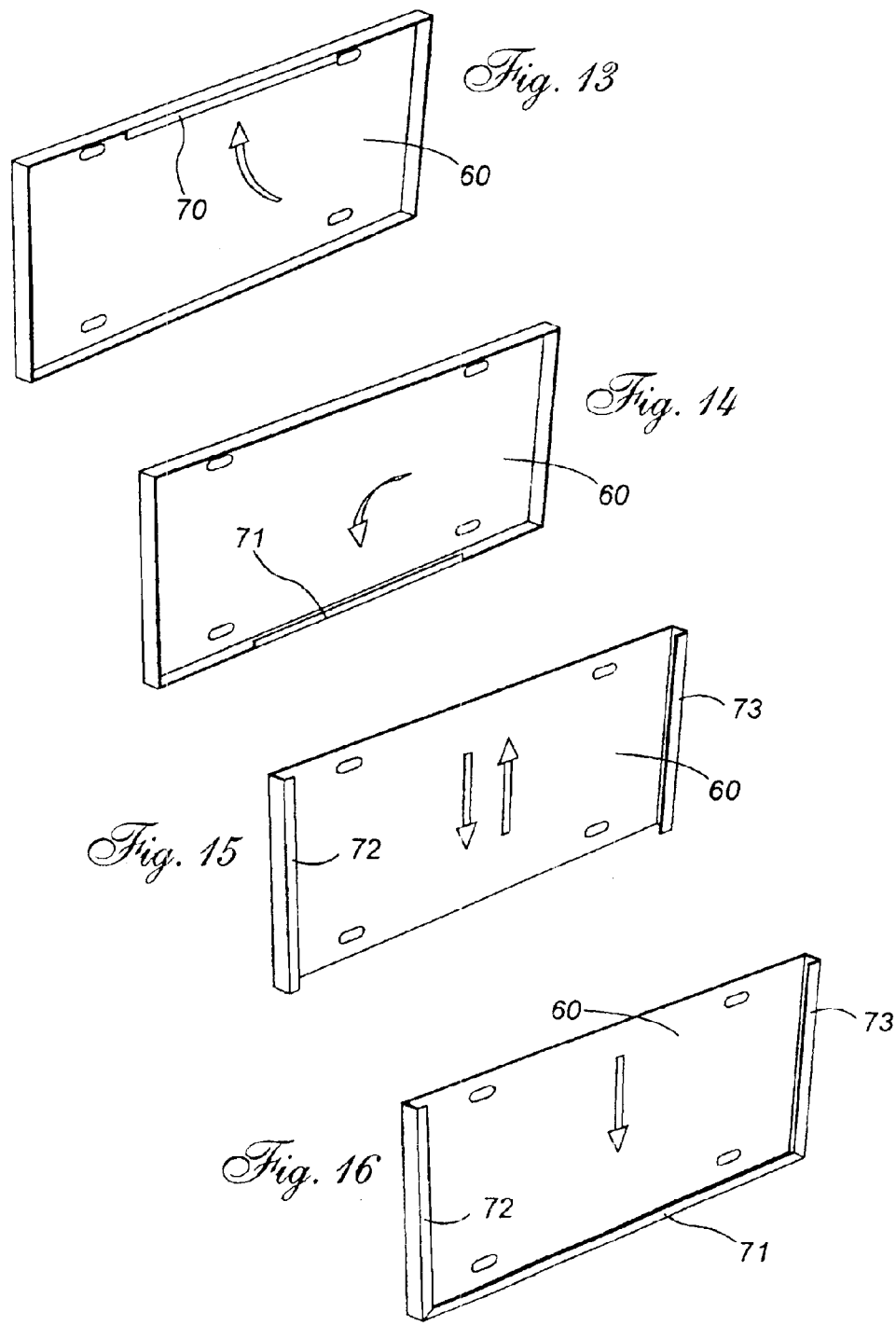

UNIVERSAL LICENSE PLATE CORD WINDER

FIELD OF THE INVENTION

The present invention relates to an improved cord-winding device universally mountable to any front or rear North-American-style license plate bracket, accommodating all electrical devices, which require a 120VAC power supply for a vehicle. The present invention comprises; a housing containing: a reel a connection box, a male cord housing, a cord hatch and mounting holes, a closure plate and a universal mounting plate. A female receptacle extends from the housing to allow electrical connections to be made in a place away from weather exposure such as engine or rear compartment. The universal license plate cord winder of the present invention can also be mounted either from the top or the bottom of housing without compromising the structural integrity of the attachment while maintaining a water tightness required by such a device.

BACKGROUND OF THE INVENTION

It is common for conventional electric or hybrid vehicles to be adapted with components, which require a 120VAC power supply for operation. Such components may include: engine block heater, interior heaters, battery warmers, battery chargers and the like. These commonly require an extension cord to function. Said cord must be rolled out of the vehicle path prior to departing.

The inventor sought to provide vehicle owners with an unobtrusive, thin, easy-to-use electrical-cord winder, which is neatly stored behind the vehicle's front or rear license plate. Furthermore, the inventor also sought to greatly improve safety within the present invention by allowing for the electrical connection to the vehicle to be made in the engine compartment from the front plate, or in the rear compartment from the rear plate thus preventing exposure to the connection from the elements.

The applicant is aware of attempts in prior art to provide means of reeling an extension cord behind a license plate.

An example of prior art may be had when referring to U.S. Pat. No. 6,264,016 of Bales, issued Jul. 24, 2001 depicting a mobile power center with self-retracting cord having a cord spring loaded winding spindle within a large housing, a 12VDC to 120VAC inverter, and extended lips around the front-most perimeter of the housing so as to wrap excess cord therearound and a female AC receptacle on housing for plugging a block heater. However, this invention, like most of this nature will fail when attempting to plug a block heater within the housing at the license plate area since most block heater cords are too short to reach much past the front edge of the vehicle's hood. Furthermore, at a typical diameter of 5.5 inches, which is the standard height of a license plate, can only hold a limited length of standard round extension cord material thereby limiting said cord to an impractical length. Additionally, there are no means to stabilize the housing when mounted since the unfastened edge would be separable for the license plate mounting bracket.

Another example may be had in referring to U.S. Pat. No. 5,669,471 of Unze, issued Sep. 23, 1997, which teaches of a trailer wire recoil device having a housing containing a rotatable member on which a trailer wire extension may be reeled thereon. The application of the device is clearly limited to trailer wires and therefore impractical for bloc heaters. Again, there are no means to stabilize the housing when mounted since the unfastened edge would be separable for the license plate mounting bracket.

Another example may be had in referring to U.S. Pat. No. 5,803,216 of McNaughton, issued Sep. 8, 1998, which depicts a retractable extension cord holder and receptacle for an automobile having a housing a cord reel, a receptacle and a retractable cord. This invention also limits the length of cord due to restrictive housing measurements while also failing in that the block heater cord from the vehicle, in most cases will not reach the cord winder.

SUMMARY OF THE INVENTION

It is thus the object of the present invention to provide vehicle owners with an improved electrical cord-winding device universally mountable to any North-American-style license plate bracket. Furthermore, the present improved cord winder ensures all electrical 120VAC vehicle accessory devices reach the winder's outlet.

In one aspect of the invention, a flat-type cord is used for the extension portion so as to allow a more compact reeling of said cord thereby increasing the usable length.

In another aspect of the invention, the female receptacle is extended from the housing in order to make the connection to the electrical device within the vehicle's engine or rear compartment thereby preventing exposure of the connection to the weather elements.

In another aspect of the invention, a specially formed universal mounting plate is provided to stabilize the units to the license plate mount while allowing secure installation to any North American style license plate bracket.

Accordingly, the system of the present invention therefore provides an unobtrusive, thin, easy to-use electrical cord-winding device universally mountable to any North-American-style license plate bracket while providing for a sheltered connection from the elements.

BRIEF DESCRIPTION OF THE DRAWINGS

These and other advantages of the invention will become apparent upon reading the following brief description and upon referring to the drawings in which:—

FIG. 1 is a perspective view from below of the universal license plate cord winder of the present invention.

FIG. 2 is a cutout perspective view from below of the universal license plate cord winder of the present invention.

FIG. 3 is a front elevation view of the universal license plate cord winder of the present invention.

FIG. 4 is a bottom plan view of the universal license plate cord winder of the present invention.

FIG. 5 is a top plan view of the universal license plate cord winder of the present invention.

FIG. 6 is a left side elevation view of the universal license plate cord winder of the present invention.

FIG. 7 is a right side elevation view of the universal license plate cord winder of the present invention.

FIG. 8 is a perspective view of the mounting plate portion of the universal license plate cord winder of the present invention.

FIG. 9 is a partial top plan view of the universal license plate cord winder of the present invention as installed within a conventional license plate bracket.

FIG. 10 is a cross-sectional view taken from FIG. 3 of the hatch assembly portion of the universal license plate cord winder of the present invention.

FIG. 11 is a cross-sectional view taken from FIG. 1 of the universal license plate cord winder of the present invention.

FIG. 12 is a cross-sectional view taken from FIG. 10 of the hatch portion of the universal license plate cord winder of the present invention.

FIG. 13 is a prior art example of a conventional license plate mounting bracket on which the universal mounting plate of the present invention may be installed.

FIG. 14 is a prior art example of a conventional license plate mounting bracket on which the universal mounting plate of the present invention may be installed.

FIG. 15 is a prior art example of a conventional license plate mounting bracket on which the universal mounting plate of the present invention may be installed.

FIG. 16 is a prior art example of a conventional license plate mounting bracket on which the universal mounting plate of the present invention may be installed.

While the invention is described in conjunction with preferred illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

In the following description, similar features in the drawings have been given similar reference numerals.

Turning to the drawings, in particular, FIG. 1, which illustrates a perspective view from below of the universal license plate cord winder of the present invention showing; a housing 2 having an inner molded spindle 4, a plurality of mounting bolt holes 6, a splatter guard 8, a receptacle cord 10, a receptacle cord outlet 12 and cord to housing connecting member 14, a hatch assembly having; a hatch 20, and knob 22, and a mounting plate 30.

Turning now to FIG. 2, a cutout perspective view from below of the universal license plate cord winder of the present invention comprising; a housing 2 having an inner molded spindle 4, a plurality of elongated mounting screw holes 6 having hole extensions 5, a plurality of screw assembly receivers 11, a splatter guard 8, a receptacle cord 10, a receptacle cord outlet 12, a cord to housing connecting member 14, and a power-on indicator light 32, a reel assemble 17 having a spring coil 15 an electrical raceway 19 for continuous conductivity, a male cord end 3, an extension cord 13, a hatch assembly having; a hatch 20, and knob 22, a closure plate 9 having hole-extension receiving members 7 and perforations therethrough for receiving fasteners in assembly, and a mounting plate 30.

In reference now to FIG. 3, a front elevation view of the universal license plate cord winder of the present invention illustrating in particular, the splatter guard 8 and how it prevents oncoming rain and splatter from leading vehicles to enter the housing 2 of the present invention. The power-on indicator light 32 is also positioned so as to be viewed from the front, top and side of the vehicle.

Turning now to FIG. 4, a bottom plan view of the universal license plate cord winder of the present invention illustrating more particularly the positioning of the mounting plate 30 combinedly attached to the closure plate 9 and housing 2 with bolts. The mounting plate 30 having extruded member 41 extending rearwardly from the housing assembly 2, and flanges 40 extending outwardly from the extruded members 41 distal from the housing to an apparent edge equal to the outer edges of the housing 2.

In reference now to FIG. 5, a top plan view of the universal license plate cord winder of the present invention illustrating the correlation between the mounting plate 30 and the housing assembly 2. The top portion of the housing has no openings in which moisture could penetrate. The power-on indicator light 32 is also shielded from said moisture with a rim barrier 45. The hatch assembly 50, is provided with an awning member 18 again to prevent moisture from leaking within the hatch knob channel.

Referring now to FIG. 6, a left side elevation view of the universal license plate cord winder of the present invention illustrating again the correlation between the mounting plate 30 and the housing assembly 2. The left side portion of the housing has a sealed opening in which the power-on indicator light 32 is installed and also shielded from said moisture with a rim barrier 45.

Referring now to FIG. 7, a right side elevation view of the universal license plate cord winder of the present invention showing in particular, the hatch assembly within the housing 2. An hatch knob channel 48 receives a protruding member of the hatch knob 22, which said protruding member snaps firmly in place within a mating opening trough the hatch 20 thereby connecting the hatch knob 22 and the hatch 20. A spring 24 applies constant downward pressure on the hatch to ensure said hatch 20 remains closed when not in use. Furthermore, said spring 24, by applying greater pressure onto the male cord 10 than the pressure excreted by the recoil spring 15 of the reel 21, thereby allows said springed hatch 20 to act as a brake to prevent male cord wire 10 from recoiling when in use. To recoil said cord 10, user simply lifts hatch 20 with knob 22. A splatter guard 8 and awning 18 also help prevent moisture and splatter from entering the housing.

In reference now to FIG. 8, a perspective view from the rear of the mounting plate portion 30 of the universal license plate cord winder of the present invention wherein said plate 30 is formed from a resilient sheet material having extruded member 41 extending rearwardly from the housing assembly 2, and flanges 40 extending outwardly from the extruded members 41 distal from the housing to an apparent edge equal to the outer edges of the housing 2. A plurality elongated perforations 51 traverse said plate 30 thereby allowing mounting bolts to traverse plate 30 to be attached to the license plate mounting bracket.

The universal mounting plate 30 therefore installs where a license plate would normally be placed.

In reference to FIG. 9, illustrating a partial top plan view of the present invention illustrated as installed within a conventional license plate mounting plate 60 wherein the extension members 41 of the mounting plate 30 of the present invention extend the flanged members 40 to within the depth of the license plate mounting bracket 60 thereby providing a stable and dependable installation of the housing 2 of the present invention. Once the mounting bolts are attached to the license plate mounting bracket 60, the device of the present invention is securely attached to the vehicle without fear of detachment.

FIG. 10, a cross sectional view taken from FIG. 3 illustrates the inner components that make up the sliding hatch assembly 50 and the connecting member's 11 relationship to the housing assembly wherein, a housing 2 integrally includes an upper spring guide 46, a connecting member 11 and knob slot. A closure 9 also integrally includes a lower spring guide 47 and a perforation through which a screw 36 may traverse to be engaged within the hollow bore of the connecting member 11. The upper spring guide 46 and the lower spring guide 47, when the housing 2 and closure 9 are assembled, form a generally cylindrical void of sufficient diameter to accept a spring of slightly lesser diameter than that of the above-mentioned void thereby preventing said spring from buckling outside its desired path. A hatch 20 is illustrated, having a height and width slightly lesser than an opening between the upper spring guide 46 and the upper inner surface of the outer wall portion of the housing 2, and between the lower spring guide 47 and the lower inner surface of the outer wall portion of the housing 2. A knob 22 having a snap-type protrusion passes through an elongated opening at the side wall portion of the housing 2, and is securedly attached to the hatch 20 thereby providing mechanical integration of the hatch 20 from outside the housing assembly.

Referring now to FIG. 11, a cross-sectional view taken from FIG. 2, illustrating the mounting bolt holes 6 comprising; hole extensions 5 integral with the housing 2, and hole extension receiving members 7 integral with the closure portion 9. The mounting plate 30 is also adapted with such a elongated perforation 51 thereby allowing through traverse of a mounting bolts 55 during installation of the present invention. The bolts 55 passes through similar holes in conventional license plates 60, then through the mounting bolt hole 6, through the closure 9 and are then held firmly in place with nuts 52.

Turning now to FIG. 12, a cross-sectional view taken from FIG. 11, further illustrating the hatch assembly 50 of the universal license plate cord winder of the present invention wherein, a hatch 20 having a perforation therethrough accepts a snap-type connector 28 integral with the hatch knob, and a spring pin 57 is slidably engaged between the upper spring guide 46 and the upper inner surface of the outer wall portion of the housing 2, and between the lower spring guide 47 and the lower inner surface of the outer wall portion of the housing 2. The housing 2 integrally includes a secondary spring pin 56, on which a compression spring 24 frictionally attaches therearound. Said spring 24 also frictionally attaches to the spring pin 57 of the hatch 20. The hatch 20, being slidably engaged within the housing thereby can be moved against the spring 24 to gain access to the male power cord through an opening 58 in the housing 2 created by raising the hatch 20, and automatically closes against the power cord when hatch knob 22 is released. The spring 24, by applying greater pressure onto the male cord than the pressure excreted by the recoil spring of the reel, thereby allows said springed hatch 20 to act as a brake to prevent male cord wire from recoiling when in use. To recoil said cord, user simply lifts hatch 20 with knob 22.

FIGS. 13 to 16 illustrate prior art examples of conventional license plate mounting brackets 60 on which the universal mounting plate of the present invention may be installed. FIG. 13 includes a top flange 70 under which the top flange of the present mounting plate would first go into, then bolted through the two bottom holes of the license plate mounting brackets 60. FIG. 14 includes a bottom flange 71 under which the bottom flange of the present mounting plate would first go into, then bolted through the two top holes of the license plate mounting brackets 60. FIG. 15 includes two side flanges 72 and 73 under which both side flanges of the present mounting plate would slide behind, then bolted through both either top or bottom holes of the license plate mounting brackets 60. FIG. 16 includes two side flanges 72 and 73, and a bottom flange 71 under which both side flanges and the bottom flange of the present mounting plate would slide behind from the top, then bolted through both either top or bottom holes of the license plate mounting brackets 60.

We claim:
1. A universal license plate cord winder comprising:
   a. a housing having:
      i. an inner molded spindle,
      ii. a plurality of elongated mounting screw holes having hole extensions,
      iii. a plurality of screw assembly receivers,
      iv. a splatter guard,
      v. an elongated slot for receiving a knob,
      vi. a receptacle cord,
      vii. a wiring inner housing,
      viii. cord to housing connecting member,
      ix. an upper spring guide, and
      x. a hatch guide,
   b. a hatch assembly having;
      i. a hatch,
      ii. and knob, and a mounting plate, and
      iii. a spring,
   c. a closure plate having:
      i. hole-extension receiving members and perforations therethrough for receiving fasteners in assembly,
      ii. a lower spring guide, and
      ii. a hatch guide,
   d. a power conductive path having:
      j. a power-on indicator light,
      ii. a reel assembly having a rotary spring coil and electrical raceway for continuous conductivity,
      iii. a male cord end, and
      iv. a length of extension cord in communication with both male cord end and an electrical raceway fixedly integrated outside the reel's surface,
   e. a universal mounting plate having:
      i. a generally planar surface,
      ii. perpendicularly protruding members circumferentially extending rearwardly form said planar surface,
      iii. extension members circumferentially extending outwardly from an edge of the protruding members distal from the planar surface, and
      iv. a plurality of mounting perforations through said mounting plate in general alignment with mounting perforation of the housing and closure plate.

2. The universal license plate cord winder of claim 1 wherein the elongated mounting screw holes of the housing comprise hole extensions adapted to frictionally engage within elongated mounting screw hole receivers on the closure plate so as to create water tight joinery between said housing and closure plate.

3. The universal license plate cord winder of claim 1 wherein the extension members extend to a dimension generally equal to a license plate.

4. The universal license plate cord winder of claim 3 wherein all four corners of the mounting plate are removed in order to allow a slidable insertion of said mounting plate into a license plate brackets.

5. The universal license plate cord winder of any one of claims 1 to 3 wherein a female connector is extended from the housing so as to allow the connection to a load to be made within a vehicle engine compartment or rear compartment.

6. The universal license plate cord winder of any one of claims 1–3 wherein the spring of the hatch assembly has a spring load of a greater force than a load exerted from the rotary spring coil of the reel assembly within the housing.

7. The universal license plate cord winder of claim 6 wherein the hatch may thereby act as a brake.

8. The universal license plate cord winder of any one of claims 1–3 wherein the cord winder is arranged in combination with a license plate on a vehicle to enable a connection to an electrical load within a vehicle compartment so as to protect the connection from exposure to weather elements.

* * * * *